Patented June 3, 1930

1,761,347

UNITED STATES PATENT OFFICE

MORRIS S. KHARASCH, OF RIVERDALE, MARYLAND

MARKING PROCESS AND MATERIAL AND PROCESS OF PRODUCING SAID MARKING MATERIAL

No Drawing.     Application filed November 18, 1926. Serial No. 149,275.

The invention relates to marking processes and substances and has particular reference to a process and a substance for temporarily marking upon cloth.

It is an object of the invention to provide a substance of the character described that will disappear from the cloth, wholly or at least in large part by vaporization or sublimation with or without decomposition, when heat is applied to the cloth as in the pressing thereof.

It is a further object of the invention to provide a substance of the character described which will produce marks that will disappear when the cloth is pressed, and heat applied, without leaving a stain.

It is a further object of the invention to produce material of the character described which will disappear in the pressing, and will therefore not require brushing for its removal.

It is a further object of the invention to provide a process for producing a material of the character referred to.

It is a further object of the invention to provide a process of temporarily marking fabric, whereby the marking will be visible for awhile, to serve as a guide for working, but will disappear upon the application of the heat of pressing.

Heretofore the substance used for marking upon cloth, particularly by tailors, has been either a so-called chalk made from clay, wax, or paraffine. When clay is used, it is necessary to subject the cloth to a vigorous brushing in order to get rid of the marks. When wax is used, the subsequent pressing will leave a mark upon the goods which may be removed by vigorous brushing but which will reappear upon subsequent pressing of the cloth. This is particularly noticeable on light colored fabrics.

To avoid the named defects in former marking materials, the invention provides a crystalline marking material which will decompose, vaporize, volatilize, or sublime when the heat of pressing is applied to it and wherein the material will therefore leave the cloth automatically and permanently without brushing and which will leave no spots or marks upon the cloth.

In the furtherance of this object, applicant provides a marking material made up of a white crystalline substance which is usually although not necessarily organic, and which is first powdered (if not obtained in powdered form) and then compressed into a pellet or slab in any of the forms in common use. Such a slab may be used in the manner of ordinary tailor's chalk to produce a white mark of uniform size on the cloth. The substance used has such volatility that the mark will remain on the cloth for a sufficient time to permit the usual working of the cloth into clothes, usually for at least twenty-four (24) hours, but which when subjected to the heat incident to pressing the cloth will at least in large part be vaporized or sublimed, with or without decomposition, and pass off with the steam from the cloth.

A great many substances have been tested and found more or less suitable for the purpose. The most suitable substance tested to date is found to be benzoic acid which is normally a white crystalline powder and which when compressed will retain the form of a solid indefinitely with only a slight loss in weight if exposed to the air.

A second desirable substance which is found to answer the purpose perfectly with the single objection that the marks will automatically disappear in substantially twenty-four hours even though the cloth is not heated as in pressing, is hexachloro ethane. This material however will remain in solid form a sufficient length of time when compressed if kept in a closed receptacle.

A substance comprising hexachloro ethane and benzoic acid mixed and compressed is entirely suitable for the purpose but has no marked advantages over compressed benzoic acid alone.

A third substance which is found to be most desirable is boric acid, which is a white substance that can be pressed into the desired slab or marker form and will remain in that form indefinitely with very little loss in weight even when exposed to air at normal temperatures.

Other substances have been tested and found satisfactory among which are naphthalene, malonic acid, chlorinated aliphatic hydrocarbons, chlorinated benzene hydrocarbons, ortho phthalic acid, phthalic anhydride, salicylic acid, hexamthylene tetramine, ethyl malonic acid, para formaldehyde, camphor and others too numerous to mention.

The desirable qualities for a material for the purpose intended and to achieve the objects of the present invention are that the material when compressed into a solid form shall be sufficiently hard to not crumble easily and yet sufficiently soft to mark well and to produce a mark of uniform size; that the material in stick form shall not too readily volatilize, decompose, or sublime and yet shall readily do so when subjected to the heat of pressing. It is found that both benzoic acid and boric acid offer these qualities in a satisfactory manner and therefore it is preferred to use either of these substances or a mixture of benzoic acid with hexachloro ethane as the preferred form of invention. However the invention is not limited to the substances named herein except in so far as indicated by the scope of the appended claims.

With any of the materials named, all of which are crystalline, the materials are compressed into any convenient form, usually that of ordinary tailors' marking chalks; and the marker thus formed is used to mark the cloth or fabric in the usual manner of marking. When the fabric is pressed or ironed, usually after having been dampened or covered with a damp cloth, the heat incident to the pressing causes the marks to disappear. This is usually vaporizing, volatilizing, or subliming the marking material, with the steam arising from the dampness which was applied to the fabric; and readily occurs even though the temperature incident to the pressing is below the boiling point (if any) of the material. Some of the materials named have no intermediate liquid state between the solid and the gaseous states, at ordinary pressures; and all of them, and many others that might be named, have the property of being able to pass to the vapor state at the temperature of pressing.

In some instances, the marking substance may not wholly pass off as a vapor on the first pressing, but it nevertheless disappears. This is due to a melting or dissolving of the crystals of the substance, and its dissipation into the fabric; and to the fact that if any such substance thus remains it may crysallize in the goods in minute white crystals which are not visible in either dark or light fabric.

The working temperature of the iron used in pressing fabric may and does vary between fairly wide limits, but for efficient pressing operations such temperature of the iron is considerably above 100° C., so that it may produce vaporization of the water with which the fabric is dampened prior to the pressing. The temperature of the iron will ordinarily probably range from 110° C. to 150° C., and will be varied in accordance with the nature of the fabric being pressed; but my invention is not dependent on any precise temperature of the iron, and contemplates the whole range of temperatures ordinarily used. When the iron is used for pressing dampened fabric, the moisture in the fabric is converted into steam, which steam is substanially at 100° C.; for regardless of the temperature of the iron, it is practically impossible to confine the steam arising from the fabric as is necessary for producing any substantial superheating of the steam. Therefore, it is at temperatures of about 100° C. that the marks made by such substances disappear upon pressing dampened fabrics. In some cases this disappearance of the marks may be by simple subliming, in some cases by steam distillation, in some cases in part by a dissolving of the material forming the marks in the water at the high temperature incident to the pressing and a dispersion of the particles of such substance so that the marks become invisible, and probably in most cases by a combination of all of these actions.

I claim:

1. A marking substance completely removable by the heat incident to pressing cloth comprising a mixture of crystalline substances each adapted to readily vaporize upon the application of heat, whereby marks made thereby upon fabric will be caused to disappear in the act of pressing the fabric.

2. A marking substance comprising a mixture of benzoic acid and hexachloro ethane compressed to cause coherence of the particles.

3. A marking substance comprising benzoic acid compressed into a coherent form.

4. The process of producing a marking material which comprises compressing powdered benzoic acid mixed with powdered hexachloro ethane to cause the mixture to cohere.

5. The process of producing a marking material which comprises compressing powdered benzoic acid to cause the mass to cohere.

6. A marking substance completely removable by the heat of steam comprising a crystalline material which is solid at atmospheric temperature and readily vaporized by steam, which substance is powdered and compressed into the form of a marking slab.

7. The process of marking upon goods and removing the marks therefrom which comprises making marks by application of a readily vaporizable crystalline substance solid at atmospheric temperature and completely removing said marks from the goods by causing them to pass off with the steam in the act of pressing the goods.

8. The process of marking upon goods and removing the marks therefrom which comprises making marks by application of a substance having a sufficiently low vapor pressure to persist during the space of time ordinarily occupied by manufacturing goods into garments but also being at least for the most part vaporizable by the heat of pressing, and completely removing said marks in the act of pressing the goods.

9. The process of marking upon goods and removing the marks therefrom which comprises making marks by application of a white organic compound readily vaporizable by the heat of pressing and completely removing said marks by heat in the act of pressing the goods.

10. The process of marking upon fabrics and subsequently removing marks therefrom, which comprises making marks by the application of a crystalline marking substance which will persist in the form of such marks on the fabric during the space of time ordinarily occupied in manufacturing the fabric into garments but will at least in large part vaporize and thus disappear from the fabric and thereby cause the marks to disappear at a temperature not exceeding that incident to pressing the goods, and subsequently removing such marks by so causing such substance to vaporize and thus disappear from the fabric.

11. The process of marking upon fabrics and subsequently removing marks therefrom, which comprises making marks by the application of a crystalline marking substance which will persist in the form of such marks on the fabric during the space of time ordinarily occupied in manufacturing the fabric into garments but will vaporize from the fabric and thereby cause the marks to disappear at a temperature not exceeding that incident to pressing the goods, and subsequently causing such marks to disappear by so pressing the goods to vaporize such substance.

12. A marking substance, comprising, compressed into coherent form, a compressed powdered crystalline material which will make marks on fabrics, is solid at ordinary temperatures, is sufficiently resistant to vaporization at ordinary temperatures so that the marks made thereby persist for the space of time ordinarily occupied in manufacturing into garments the fabrics so marked, and is sufficiently vaporizable so that the marks made by it on the goods will disappear upon raising the temperature to that of pressing the fabric.

13. The process of producing a marking material, which comprises compressing sufficiently to cause to cohere a mass of powdered crystalline material which is capable of making marks on fabrics, is sufficiently resistant to vaporization so that the marks so made will persist for the space of the time ordinarily required to manufacture the fabric into garments, and is sufficiently vaporizable so that such marks disappear upon raising the temperature of the marked textile to the temperature incident to pressing.

14. A marking material for fabric, comprising a slab or block of powdered crystalline material compressed into slab or block form, which crystalline material may be abraded from the block when rubbed on fabric to produce a mark, and is sufficiently non-volatile so that the mark so made will persist for at least twenty-four (24) hours at normal temperatures and yet sufficiently volatile so that the material forming the mark will disappear from the surface of the fabric and at least in large part sublime or volatilize with or without decomposition under the heat to which the fabric is subjected in pressing.

MORRIS S. KHARASCH.